US006303690B1

(12) United States Patent
December et al.

(10) Patent No.: US 6,303,690 B1
(45) Date of Patent: Oct. 16, 2001

(54) CATHODIC ELECTROCOAT HAVING A CARBAMATE FUNCTIONAL RESIN AND A CARBAMATE FUNCTIONAL REACTIVE ADDITIVE

(75) Inventors: Timothy S. December, Rochester; Walter H Ohrbom, Hartland Township, both of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/464,433

(22) Filed: Dec. 15, 1999

(51) Int. Cl.[7] .................... C09D 133/14; C09D 163/00; C09D 175/12
(52) U.S. Cl. .............. 525/163; 525/123; 525/142; 525/157; 525/328.2; 525/484; 525/528; 525/533; 204/501; 204/504; 204/505; 204/506
(58) Field of Search ........................... 525/157, 163, 525/518, 510, 123, 142, 484, 528, 533, 328.2; 204/501, 504, 505, 506

(56) References Cited

U.S. PATENT DOCUMENTS

| | | | |
|---|---|---|---|
| 2,979,514 | * | 4/1961 | O'Brien et al. .................. 260/340.2 |
| 3,479,328 | * | 11/1969 | Nordstrom ......................... 260/86.1 |
| 3,639,657 | | 2/1972 | Moran et al. . |
| 3,674,838 | * | 7/1972 | Nordstrom ............................ 260/482 |
| 4,126,747 | * | 11/1978 | Cowherd, III et al. . |
| 4,279,833 | * | 7/1981 | Culbertson et al. . |
| 4,340,497 | * | 7/1982 | Knopf . |
| 4,501,833 | * | 2/1985 | Bosso et al. . |
| 4,520,167 | | 5/1985 | Blank et al. ........................... 525/131 |
| 4,814,382 | | 3/1989 | Hoy et al. . |
| 4,977,231 | | 12/1990 | McVay et al. . |
| 5,075,386 | | 12/1991 | Vanderbilt . |
| 5,115,015 | | 5/1992 | Richey, Jr. et al. ................. 524/507 |
| 5,158,808 | | 10/1992 | Hoy et al. . |
| 5,336,566 | | 8/1994 | Rehfuss . |
| 5,356,669 | * | 10/1994 | Rehfuss et al. . |
| 5,431,791 | | 7/1995 | December et al. . |
| 5,512,639 | | 4/1996 | Rehfuss et al. . |
| 5,527,614 | | 6/1996 | Cartpenter . |
| 5,552,497 | * | 9/1996 | Taylor et al. . |
| 5,559,195 | | 9/1996 | McGee et al. . |
| 5,576,063 | * | 11/1996 | Briggs et al. . |
| 5,593,733 | | 1/1997 | Mayo . |
| 5,646,214 | | 7/1997 | Mayo . |
| 5,659,003 | | 8/1997 | Menovcik et al. . |
| 5,693,723 | | 12/1997 | Green . |
| 5,693,724 | | 12/1997 | Green . |
| 5,714,549 | | 2/1998 | Wu et al. . |
| 5,719,237 | | 2/1998 | Rehfuss et al. . |
| 5,723,552 | | 3/1998 | Menovcik et al. . |
| 5,726,246 | | 3/1998 | Rehfuss et al. . |
| 5,726,254 | | 3/1998 | Wu et al. . |
| 5,744,550 | | 4/1998 | Menovcik et al. . |
| 5,766,769 | | 6/1998 | Ohrbom et al. . |
| 5,827,931 | | 10/1998 | Menovcik et al. . |
| 5,866,259 | | 2/1999 | Harris et al. ........................ 428/424.4 |
| 5,872,195 | | 2/1999 | Green et al. ........................... 525/481 |
| 6,165,338 | * | 12/2000 | December ............................ 204/506 |

FOREIGN PATENT DOCUMENTS

| | | | | |
|---|---|---|---|---|
| 1295767 | * | 2/1992 | (CA) ............................... C09D/7/12 |
| 198 24 656 A1 | | 12/1998 | (DE) ............................. C07C/271/18 |
| WO 87/00851 | | 2/1987 | (EP) ............................... C09D/7/12 |
| WO 88/02766 | | 4/1988 | (EP) ............................... C09D/7/00 |
| 0 440 583 A2 | | 1/1991 | (EP) ............................. C08G/59/54 |
| 0 680 988 A | | 11/1995 | (EP) ............................. C08G/71/00 |
| 0767 226 A | | 4/1997 | (EP) ............................ C09D/201/00 |
| 0 780 455 A | | 6/1997 | (EP) ............................ C09D/201/06 |
| 0 889 101 A2 | | 1/1999 | (EP) ............................... C09D/5/44 |
| WO 99/33915 | | 7/1999 | (EP) .............................. C08L/33/14 |
| WO 00 37572A | | 6/2000 | (EP) ............................... C09D/5/44 |
| WO 00 37573A | | 6/2000 | (EP) ............................... C09D/5/44 |

OTHER PUBLICATIONS

Marcia Agostinho & Vincent Brytus, "A high solids one–component, low temperature bake epoxy coatings," J. Coating Tech., Sep. 1988, at apge 61.

* cited by examiner

*Primary Examiner*—Patricia A. Short
(74) *Attorney, Agent, or Firm*—Mary E. Golota

(57) ABSTRACT

The invention provides a cathodic electrocoat coating composition having (A) a polymer comprising at least one primary carbamate group and at least one cationic salting site, (B) a curing agent having groups that are reactive with said functional groups on (A), and (C) a reactive additive comprising at least one compound having a molecular weight of from 131 to 2000 and comprising at least one primary carbamate group and at least one alkyl group selected from the group consisting of branched alkyl groups of from 5 to 30 carbons, straight chain alkyl groups of more than 10 carbons, and mixtures thereof, wherein one or both of (A) and (B) comprise groups that are reactive with the primary carbamate group of (C).

30 Claims, No Drawings

CATHODIC ELECTROCOAT HAVING A CARBAMATE FUNCTIONAL RESIN AND A CARBAMATE FUNCTIONAL REACTIVE ADDITIVE

FIELD OF THE INVENTION

The present invention relates to cathodic electrocoat coating compositions and methods of cathodic electrodeposition using the compositions of the invention. More particularly, the invention provides cathodic electrocoat compositions having a carbamate functional resin having at least one cationic salting site, a curing agent, and a particular carbamate functional reactive additive.

BACKGROUND OF THE INVENTION

Coating compositions are widely in use today which utilize a variety of cure mechanisms. Among these are anodic and cathodic electrodeposition coating compositions and methods wherein a film-forming composition is deposited on a substrate under the influence of an applied electric potential. "Electrodeposition" as used herein refers to electrophoretic deposition. "Electrocoat" as used herein refers to both coating compositions used in electrophoretic deposition processes and to coating films obtained from electrophoretic deposition processes.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. This coating is usually converted to a hard high molecular weight coating by curing or crosslinking of the resin, usually upon exposure to elevated temperatures. In cathodic electrocoat, the workpiece being coated serves as the cathode.

One curing mechanism utilizes a melamine formaldehyde polymer-curing agent in the electrodepositable coating composition to react with hydroxyl functional groups on the electrodeposited resin. This curing method provides good cure at relatively low temperatures (e.g., 132° C.), but the crosslinked bonds contain undesirable ether linkages and the resulting coatings provide poor overall corrosion resistance.

For example, U.S. Pat. No. 4,501,833 discloses aminoplast curable cationic coating compositions that contain an onium salt-group containing polymer and a specific aminoplast curing agent. However, the performance of the cured coating is believed to be less than that desired by current commercial conditions.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime, lactam, or alcohol).

Blocked polyisocyanates,.however, require high temperatures (e.g., 176° C. or more) to unblock and begin the curing reaction. The resulting electrocoats can also be susceptible to yellowing. Moreover, the volatile blocking agents released during cure can cause other deleterious effects on various coating properties, as well as increasing VOC. In addition, use of some the volatile blocking agents may give rise to environmental concerns. Finally, the volatile blocking agents account for significant and disadvantageous weight loss upon crosslinking.

In addition to the foregoing problems, prior art electrocoat compositions have sometimes lacked good flow and/or leveling. Ideally, an electrocoat coating composition will possess good flow and leveling at a desirable dip viscosity and solids. It is thus desirable to obtain an electrocoat coating composition which would is free of the foregoing problems but also exhibits good flow and leveling at a desirable dip viscosity and desirably high solids. It would also be advantageous to obtain such improvements with the add of a component which resulted in advantageous urethane linkages upon crosslinking, rather than undesirable ether linkages.

Pending U.S. Pat. No. 6,165,338 discloses cathodic electrocoat compositions having carbamate functional resins. Although such compositions provide advantages over the prior art, further improvements are desired.

U.S. Pat. Nos. 4,814,382, 5,114,015, and 5,158,808 describe the use of certain N-alkyl carbamate compounds as reactive diluents in coating compositions having OH—functional curable polymer resins. These compounds, however, may require excessively-high catalyst or temperature levels in order to fully react into the crosslink matrix during cure of the film.

WO 87/00851 describes the use of certain reactive carbamate derivatives in an effort to minimize the emission of volatile organic compounds (VOC). U.S. Pat. No. 5,744,550 describes the use of primary carbamate additives. However, further reductions in VOC are desireable without loss of desirable performance properties such as etch resistance and the like.

There is thus a need in the art for electrodepositable coating compositions that can provide desirable urethane crosslink linkages, but avoid the problems that accompany the use of blocked polyisocyanate curing agents. In particular, it is desireable to provide a cathodic electrodeposition coating composition capable of providing urethane linkages at low bake temperatures of 121° C. or less with decreased weight loss upon crosslinking, while being free of isocyanates and the volatile blocking agents used with isocyanates.

SUMMARY OF THE INVENTION

It has been unexpectedly discovered that the foregoing objects can be achieved with the use of the cathodic electrocoat coating composition of the invention. the electrocoat coating composition of the invention requires (A) a polymer comprising at least one primary carbamate group and at least one cationic salting site, (B) a curing agent having groups that are reactive with said functional groups on (A), and (C) a reactive additive comprising at least one compound having a molecular weight of from 131 to 2000 and comprising at least one primary carbamate group and at least one alkyl group selected from the group consisting of branched alkyl groups of from 5 to 30 carbons, straight chain alkyl groups of more than 10 carbons, and mixtures thereof, wherein one or both of (A) and (B) comprise groups that are reactive with the primary carbamate group of (C).

The invention further provides a method of electrocoating a substrate, the composition comprising 1) immersing a conductive substrate in a coating composition comprising, in an aqueous medium: (A) a polymer comprising at least one primary carbamate group and at least one cationic salting site, (B) a curing agent having groups that are reactive with said functional groups on (A), and (C) a reactive additive comprising at least one compound having a molecular weight of from 131 to 2000 and comprising at least one primary carbamate group and at least one alkyl group selected from the group consisting of branched alkyl groups of from 5 to 30 carbons, straight chain alkyl groups of more than 10 carbons, and mixtures thereof, wherein one or both of (A) and (B) comprise groups that are reactive with the primary carbamate group of (C), 2) applying a voltage between an anode and the conductive substrate, and 3) removing the substrate from the coating composition.

DETAILED DESCRIPTION OF THE INVENTION

The electrocoat coating composition of the invention requires (A) a polymer comprising at least one primary carbamate group and at least one cationic salting site, (B) a curing agent having groups that are reactive with said functional groups on (A), and (C) a reactive additive comprising at least one compound having a molecular weight of from 131 to 2000 and comprising at least one primary carbamate group and at least one alkyl group selected from the group consisting of branched alkyl groups of from 5 to 30 carbons, straight chain alkyl groups of more than 10 carbons, and mixtures thereof. One or both of (A) and (B) must contain one or more groups which are reactive with the primary carbamate group of (C).

The polymer (A) of the invention will have at least one primary carbamate group appended to a polymer backbone, preferably a plurality of pendent carbamate functional groups. In addition, the polymer (A) must further comprise one or more cationic salting sites or group.

As used herein, "primary carbamate group" refers to the functional group having the structure

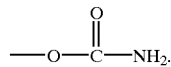

Thus, the primary carbamate group of the invention may be defined as a terminal or pendent carbamate group.

The carbamate functional polymer (A) may be prepared in a variety of ways.

One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. In a preferred embodiment, at least one of the ethylenically unsaturated monomers will have a pendant cationic salting group.

As used herein, the term "cationic salting site" refers to a functional group which is sufficiently basic to undergo reaction with an acid to produce a salt, which, while in an aqueous dispersion in the presence of a voltage, will undergo decomposition and facilitate the formation of a insoluble polymer which deposits on a substrate immersed in the aqueous dispersion. Preferred cationic salting groups are amine functional groups and quaternary ammonium salts. The amine functional groups of the polymer (a) may be primary, secondary, tertiary amino groups or quaternary ammonium salts. Quaternary ammonium salts and tertiary amines are most preferred, with quaternary ammonium groups especially preferred. Such groups may also be part of polyamines and/or alkanol amines.

The cationic salting site can be incorporated into or grafted to the polymer backbone in a variety of ways.

For example, a carbamate functional acrylic monomer can be copolymerized with an ethylenically unsaturated monomer having at least one cationic salting group. The cationic salting group may be a primary, secondary, or tertiary amine functional group, or a quaternary ammonium salt, or a mixture thereof. Illustrative examples of such monomers are methacrylamide, acrylamide, dimethylaminoethyl methyacrylate, mixtures thereof, and the like. Another example of a suitable ethylenically unsaturated monomer having amino functionality is the reaction product of glycidyl methacrylate and a tertiary amine salt. Dimethylaminoethyl methacrylate is most preferred.

Alternatively, as will be discussed below, a polymer having oxirane or glycidyl functionality can be made and the cationic salting group formed by reaction of the glycidyl group with an amine or a polyamine. Amines or polyamines may be used having primary, secondary, or tertiary amine groups. Tertiary amine salts may be used to form quaternary ammonium salts via reaction with the glycidyl group on the polymer backbone and are preferred.

Finally, a monomer such as glycidyl methacrylate can be polymerized with a ethylenically unsaturated carbamate functional monomer to produce an carbamate functional acrylic having pendent glycidyl functionality. A cationic salting site can be incorporated by reaction of an amine functional compound, polyamine, or tertiary amine salt with the oxirane group.

Examples of illustrative methods of preparing the polymer (A) of the invention having an acrylic backbone include the following.

One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator. Other suitable carbamate functional monomers include those discussed above. Illustrative suitable unsaturated amine functional compounds are as discussed above. A preferred unsaturated amine functional compound is dimethylaminoethyl methacrylate. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional monomers such as butyl acrylate and butylmethacrylate. A preferred monomer for use as an additional ethylenically unsaturated monomer is styrene.

In another and most preferred reaction scheme, an adduct may be made from a polyisocyanate such as isophorone diisocyanate (IPDI) or toluene diisocyanate (TDI) and a hydroxy functional carbamate compound such as hydroxypropyl carbamate. The resulting adduct can then be grafted onto an acrylic, epoxy or other hydroxy functional resin having suitable characteristics for use.

Another method involves a multistep reaction wherein a hydroxy carbonate may reacted with ammonia or an amine functional compound to provide a primary, secondary or tertiary carbamate functional compound. This compound is then reacted with an anhydride compound via the reaction of the hydroxy group with the anhydride ring. The carboxylic acid groups of the resulting reaction product are then reacted with the oxirane groups of a glycidyl ether of Bisphenol A. Cationic salting groups are incorporated via the reaction of an amine functional compound, such as diethanol amine, with the glycidyl ether groups which terminate the resulting hydroxy and carbamate functional polymer.

In an alternative reaction, an isocyanate functional monomer such as unsaturated m-tetramethyl xylene isocyanate (sold by American Cyanamid as TMI®) can be copolymerized with monomers such as alkyl esters such as described immediately above such as butyl acrylate and unsaturated monomers such as styrene to produce an isocyanate functional polymer. The required cationic salting group functionality and carbamate functionality can then be grafted onto the isocyanate functional polymer by a multi-stage reaction having a first stage using a carbamate functional monomer such as hydroxypropyl carbamate followed by a second stage using an amine functional compound, i.e., primary, secondary or tertiary amine groups, most preferably an alkanol amine.

A preferred method of making the polymer (A) of the invention involves the copolymerization of at least one carbamate functional monomer, at least one unsaturated amine functional compound, at least one additional ethylenically unsaturated monomer, and at least one alkyl ester of an unsaturated organic acid. A preferred reaction scheme involves the copolymerization of CEMA, dimethylaminoethyl methacrylate, styrene, and butyl acrylate in the presence of an azo or peroxide initiator.

Polymer (A) will thus generally comprise at least one repeat unit of the formula:

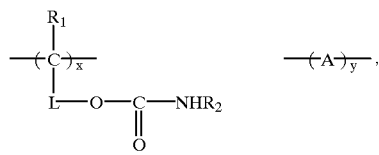

wherein
In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents at least one repeat unit having a pendant cationic salting group. As discussed above, the at least one cationic salting group may derive from the use of at least one ethylenically unsaturated monomer having at tertiary amino group. Alternatively, and most preferably, the at least one repeating unit having a pendent cationic salting site may derive from the reaction of an tertiary amine functional compound or a tertiary amine salt with a glycidyl group previously incorporated into the polymer.

L represents a divalent linking group, preferably an aliphatic of 1 to 8 carbon atoms, cycloaliphatic, or aromatic linking group of 6 to 10 carbon atoms. Examples of L include

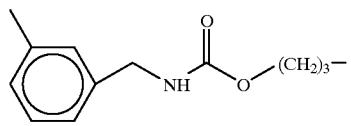

—$(CH_2)$—, —$(CH_2)_2$—, —$(CH_2)_4$—, and the like. In one preferred embodiment, —L— is represented by —COO—L'— where L' is a divalent linking group. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isoyanate group.

It will be appreciated that if polymer (A) has an acrylic backbone, polymer (A) will generally have the structure:

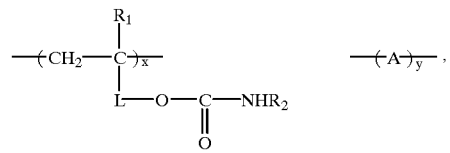

wherein
with the variables being as discussed above. In this formula, A represents repeat units derived from one or more ethylenically unsaturated monomers, at least one of which repeat units must have a pendent cationic salting group, preferably an amino group. As discussed above, the at least one cationic salting group may derive from the use of at least one ethylenically unsaturated monomer having at least one amino group. Alternatively, the at least one repeating unit having a pendent cationic salting site may derive from the reaction of an amine functional compound with a glycidyl group previously incorporated into the polymer. Other monomers which may be utilitzed to provide repeating units (A) not having pendent amino functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

As indicated above, in the most preferred embodiment, an adduct may be made from a polyisocyanate such as isophorone diisocyanate (IPDI) or toluene diisocyanate (TDI) and a hydroxy functional carbamate compound such as hydroxypropyl carbamate. The resulting adduct can then be grafted onto an acrylic, epoxy or other hydroxy functional resin having suitable characteristics for use.

Thus, most preferably, polymer (A) will comprise the reaction product of a carbamate functional intermediate adduct (A') and a hydroxy functional resin (A"), (A") most preferably also having at least one or more epoxy groups. Intermediate (A') may be made from the reaction of a polyisocyanate (ai) and a carbamate functional compound (aii) comprising at least one group which is reactive with isocyanate. Preferably, the compound (aii) will comprise at least one primary carbamate group.

Suitable polyisocyanates (ai) are monomeric polyisocyanates that can be aliphatic, cycloaliphatic, an/or aromatic polyisocyanates. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4butylene diisocyanate, lysine diisocyanate, 1,4-methylene bis-(cyclohexyl isocyanate) and isophorone;px diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylene diisocyanate can be used. Biurets of isocyanates such as DESMODUR® N100 from Bayer may also be useful. Preferably, polyisocyanate (ai) is a diisocyanate. Isophorone diisocyanate is most preferred.

Suitable examples of such isocyanate reactive, carbamate functional compounds (aii) are commercially available hydroxy functional carbamate compounds such as hydroxypropyl carbamate, hydroxybutyl carbamate, and mixtures thereof. Hydroxypropyl carbamate is most preferred. It is also within the scope of the invention to use isocyanate reactive compounds containing groups convertible to carbamate in place of the isocyanate reactive, carbamate functional compounds. Use of the term "convertible to carbamate" refers to groups which have the capability of forming carbamate groups, preferably primary carbamate groups after reaction with the polyisocyanate is completed. Examples of groups convertible to carbamate include cyclic carbonate groups, (i.e., the reaction product of glycidol and $CO_2$ then reacted with ammonia to form a carbamate group), and epoxy groups (i.e., reaction of the epoxy with $CO_2$ to form cyclic carbonate followed by reaction with ammonia).

The isocyanate reactive, carbamate functional compound (aii) is reacted with the polyisocyanate (ai) to provide an intermediate compound (A') having at least one carbamate group, preferably at least one primary carbamate group, and at least one isocyanate group.

In an especially preferred embodiment, the isocyanate reactive carbamate functional compound (aii) will be reacted with the polyisocyanate (ai) under reaction conditions sufficient to produce both the intermediate (A') having both carbamate functionality and isocyanate functionality as well as a in situ generated carbamate functional reactive additive (Ac') which is free of isocyanate functionality. In this embodiment, both (Ac') and (A') are the reaction products of a single reaction. Accordingly, (Ac') may be described as being generated "in situ" during the production of intermediate (A') and may thus be termed "in situ generated reactive additive (Ac')". Examples of suitable reaction conditions include a mole equivalent ratio of NCO to hydroxyl of from 2/1 to 2/2, preferably from 1.2 to 1.8, and most preferably from 1.3 to 1.7. Other reaction conditions to consider include temperature and catalyst type and level.

Suitable catalysts for use in the production of polymer (A) include those described below with respect to the coating composition of the invention. Preferred catalysts are those such as Lewis acids or zinc salts. A most preferred catalyst is dibutyl tin dilaurate. Preferably, the catalyst will be used in an amount of from 0.1 to 5.0%, and most preferably from 0.5 to 1.5%, based on solids.

In situ generated reactive additive (Ac') will have a number average molecular weight of from 250 to 2000 and most preferably from 400 to 800. Preferably, in situ generated reactive additive (Ac') will have a degree of carbamate functionality equal to the degree of isocyanate functionality of polyisocyanate (ai), i.e., the polyisocyanate (ai) will preferably be one half blocked for the in situ generated reactive additive (Ac').

The carbamate functional/isocyanate functional intermediate (A') is then grafted onto an acrylic, epoxy or other hydroxy functional resin (A") having suitable characteristics for use. The grafting of the intermediate (A') must occur via reaction with the at least one isocyanate group of (A') with a reactive group of (A").

Most preferably, the carbamate functional/isocyanate functional intermediate (A') will be grafted onto a hydroxy functional compound (A") comprising epoxy groups. The grafting of (A') will thus occur via reaction between a hydroxyl group and the at least one isocyanate group of (A'). Preferably, the hydroxy functional compound (A") comprising epoxy groups will be an epoxy functional resin. As discussed below, reaction of the epoxy group with a tertiary amine in the presence of an acid is a preferred method of incorporating the required one or more quaternary ammonium groups.

Suitable epoxy containing polymers are resinous polyepoxide or polymeric resinous materials containing two or more 1,2-epoxy groups per molecule. Preferred polyepoxides are polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl)ethane, bis(2-hydroxynaphthyl)methane and the like.

Other useful polyepoxide compounds are those made from novolak resins or similar polyhydroxyphenel resins.

Also suitable are polyglycidyl ethers of polyhydric alcohols such as ethylene glycol, propylene glycol, diethylene glycol and triethylene glycol.

There can also be used polyglycidyl esters of polycarboxylic acids which are produced by the reaction of epicihlorohydrin or a similar epoxy compound with an aliphatic or aromatic polycarboxylic acid such as succinic acid and terepthalic acid.

Most preferably, the epoxy-containing compound (A") to which the carbamate functional intermediate (A') is grafted onto will be the reaction product of a liquid epoxy such as diglycidyl ether of bisphenol A (DGEBA) and bisphenol A. Particularly preferred examples of such epoxy containing compounds may be characterized as upgraded epoxy resins having epoxy equivalent weights of approximately 1100. Suitable liquid epoxys are GY2600, commercially available from Ciba Geigy and Epon® 828, commercially available from Shell Chemical Company.

Thus, most preferably, polymer (A) will comprise the in situ generated carbamate functional reactive additive (Ac') generated during the production of polymer (A), most specifically during; the production of intermediate (A'). In situ generated reactive additive (Ac') will be present in the resin composition of the invention in an amount of from 1 to 20, preferably from 2 to 15 and most preferably from 3 to 10 percent, based on the total solids. The resin composition comprising both polymer (A) and in situ generated polycarbamate functional reactive additive (Ac') that is free of isocyanate functionality has been found to provide unexpected benefits in both application and performance. These advantages are separate and distinct from the instant invention's use of reactive additive (C). Moreover, in this most preferred embodiment, in situ generated reactive additive (Ac') is separate and distinct from reactive additive (C).

In this most preferred embodiment, polymer (A) will comprise one or more quaternary ammonium groups as cationic salting sites. While it necessary that polymer (A) comprise one or more quaternary ammonium groups, other cationic salting groups may also be present in polymer (A). Examples of other suitable cationic salting groups are amine functional groups such as primary, secondary, tertiary amino groups or mixtures thereof.

In general, polymer (A) may be characterized by a meq of cationic salting group, preferably a quaternary ammonium group, of from about 0.1 to 2.0 meq N/gram polymer (A), preferably from about 0.2 to 1.5 meq N/gram polymer (A), and most preferably from about 0.3 to 0.6 meq N/gram polymer (A).

In the broadest scope of the invention, the cationic salting groups may be selected as described above. However, in the most preferred embodiment, it is preferred that at least 80% of the total number of cationic salting groups be quaternary ammonium groups, more preferably from 90 to 100% of the total number of cationic salting groups, and most preferably from 95 to 100% of the total number. The remaining cationic salting groups can be as described above, with secondary amino groups being most preferred.

A preferred method of incorporating the necessary cationic salting group, i.e., a quaternary ammonium group into the polymer (A), is by reaction of a glycidyl group with one or acid salts of one or more tertiary amines. The acid salt will preferably be preformed via the mixing of one or more tertiary amines and one or more acids. Other amines or polyamines may be used having primary, secondary, tertiary amine groups, or mixtures thereof.

Suitable acids are carboxylic acids such as lactic acid and acetic acid.

Polymer (A) should also have a carbamate equivalent weight (CEW) (grams of polymer (A)+grams of in situ generated reactive additive (B)/equivalent of carbamate) of from 150 to 1200, preferably from 300 to 1100, and most preferably from 390 to 1000. Polymer (A) without reactive additive (B) will generally have a carbamate equivalent weight of from 150 to 1500, preferably from 600 to 1400, and most preferably from 800 to 1300, (grams of polymer (A)/equivalent of carbamate).

The glass transition temperature, $T_g$, of components (A), (B), and (C) can be adjusted to achieve a cured coating having the $T_g$ for the particular application involved. The average $T_g$ of unreacted components (A), (B) and (C) should be between 0° C. and 100° C., with the individual $T_g$'s being adjusted to achieve optimum performance.

Polymer (A) should also have a carbamate equivalent weight (grams of polymer (A)/equivalent of carbamate) of from 150 to 1200, preferably from 200 to 600, and most preferably from 300 to 400.

It will appreciated that the various monomers and/or reactants used to make polymer (A) will be used in amounts necessary to obtain the meq N, Tg, weight average molecular weight and carbamate equivalent weight.

Polymer (A) when reacted with an acid is water-dispersible and is useful in electrodeposition processes, especially when incorporated into an emulsion or dispersion. The aqueous dispersion of polymer (A) should be neutralized to a degree sufficient to (i) form an emulsion micelle of less than 0.50 μm, preferably less than 0.20 μm, and (ii) provide emulsion stability in the electrocoat deposition bath.

Electrodepositable coating compositions are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (A) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (A) is preferably reacted with an acid for use in the cathodic electrocoat coating composition of the invention. This reaction may be termed "neutralization or "acid-salted" and specifically refers to the reaction of the pendent amino groups with an acidic compound in an amount sufficient to neutralize enough of the basic amino groups to impart water-dispersibility to polymer (A). Illustrative acid compounds include phosphoric acid, propionic acid, acetic acid, lactic acid, or citric acid.

The cathodic coating composition of the invention also comprises a curing agent (B). Curing agent (B) is a compound having a plurality of functional groups that are reactive with the carbamate groups on component (A). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

Compounds suitable for use as reactive additive (C) are those having at least one primary carbamate group and at least one alkyl radical selected from the group consisting of straight chain alkyl groups of more than 10 carbons, branched alkyl groups of from 5 to 30 carbons, and mixtures thereof.

As used herein, "primary carbamate group" refers to the functional group having the structure

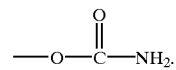

Thus, the primary carbamate group of the invention may be defined as a terminal or pendent carbamate group. Although compounds suitable for use as reactive additive (C) may comprise more than one primary carbamate group, it is most preferred that such compounds have one primary carbamate group.

In addition to the at least one primary carbamate group, compounds suitable for use as reactive additive (C) will further comprise at least one alkyl group selected from the group consisting of branched alkyl groups having from 5 to 30 total carbons, straight chain alkyl groups of more than 10 carbons, and mixtures thereof.

As used herein, the term "branched" refers to both lateral branches and forked branches. Lateral refers to a branch of two small chains at the end atom of a carbon chain. Forked refers to a branch of two small chains in the middle of a carbon chain. For the purposes of the instant invention a carbon chain may be from 1 to 15 carbons, more preferably from 1 to 8 and most preferably from 1 to 3. The total number of carbon atoms in the branched alkyl group is obtained by adding the total number of carbons in the main carbon chain+the number of carbons in all alkyl chains extending from the main carbon chain.

It will be appreciated that the main carbon chain may be from 1 to 25 carbons, preferably from 1 to 10, most preferably from 1 to 4. Most preferably, the main chain will be an aliphatic carbon chain free of unsaturation. Although the at least one branched alkyl group may comprise from 5 to 30 total carbons, more preferably, it will have from 5 to 15 carbons and most preferably from 8 to 12 carbons.

Finally, it will be appreciated that suitable "at least one alkyl groups" for use in reactive additive (C) will be substantially free of functional groups that are reactive with one or more of components (A) and (B). Thus, the at least one alkyl group selected from the group consisting of branched alkyl groups having from 5 to 30 total carbons, straight chain alkyl groups of more than 10 carbons, and mixtures thereof, will be free of hydroxyl groups and the like.

An example of an especially suitable at least one branched alkyl group is

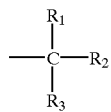

wherein $R_1$, $R_2$, and $R_3$ are alkyl groups of from 1 to 10 carbons each, preferably aliphatic groups of from 1 to 10 carbons. Most preferably, $R_1$, $R_2$, and $R_3$ will total from 8 to 12 carbons with at least one of $R_1$, $R_2$, and $R_3$ being a methyl group.

In another suitable branched alkyl group of the same structure, one of $R_1$, $R_2$, and $R_3$, may be hydrogen, with the other substituent groups being alkyl groups of from 1–10 carbons, preferably aliphatic groups of from 1 to 10. An example of such a group is

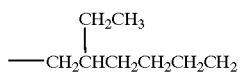

In this instance, the above structure is understood to be an example of lateral branching.

In a particularly preferred embodiment, the at least one branched alkyl group will comprise

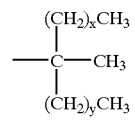

wherein x+y=5 carbons.

Alternatively, the compound suitable for use as reactive additive (C) may include a straight chain alkyl group of more than 10 carbons, preferably more than 15 carbons and most preferably more than 18. Examples of suitable straight chain, aliphatic alkyl groups include 1-eicosanyl, 1-octadecyl, 1-arachidyl, 1-dodecyl, 1-decyl, and 1-octyl, and the like. It is most preferred that compounds suitable for use as reactive additive (C) include at least one group which is a branched alkyl group such as described above.

Compounds suitable for use as reactive additive (C) may further include heteratoms such is O and N, most preferably O. Such heteratoms may be incorporated in the form of groups such as esters, hydroxyls, ether, carboxyls, mixtures thereof and the like. Preferred are esters, hydroxyls, and mixtures thereof. Most preferably, a compound will comprise at least one hydroxyl group and one ester group in addition to the carbamate functional group and the at least one alkyl group. As indicated above, such heteratoms may not be present in the branched alkyl group nor in the straight alkyl chain group of more than 10 carbons.

Particularly suitable compounds for use as reactive additive (C) are those having the formula:

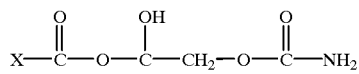

wherein X is a branched alkyl radical of from 5 to 30 total carbons, more preferably from 5 to 15 total carbons and most preferably from 8 to 12 total carbons.

A more preferred compound for use as reactive additive (C) is that having the formula:

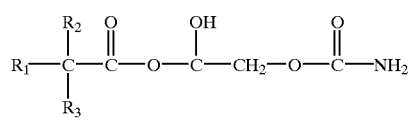

wherein $R_1$, $R_2$, and $R_3$ are each alkyl groups of from 1 to 10 carbons, especially compounds wherein $R_1$, $R_2$, and $R_3$ total from 8 to 12 carbons with at least one of $R_1$, $R_2$, and $R_3$ being a methyl group.

The most preferred compound for use as reactive additive (C) is that having the formula:

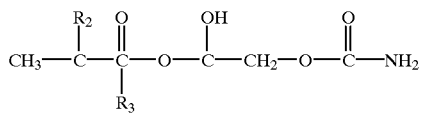

wherein $R_2$ and $R_3$ are respectively —$(CH_2)_xCH_3$ and —$(CH_2)_yCH_3$ wherein x+y=5.

The invention further provides a method of making the reactive additive of the invention. It has been discovered that the most preferred reactive additive of the invention can be made by providing a compound having at least one epoxy group and at least one alkyl group selected from the group consisting of branched alkyl groups of from 5 to 30 total carbons, straight chain alkyl groups of more than 10 carbons, and mixtures thereof. It is preferred that the compound provided will comprise at lest one branched alkyl group of from 5 to 30 total carbons. More preferably the epoxy functional compound will have one epoxy group and a branched alkyl group of from 5 to 15 total carbons and most preferably from 8 to 12 total carbons.

Examples of preferred epoxy functional/branched alkyl group containing compounds are glycidyl ethers, glycidyl esters, and epoxies based on alpha olefins, 2-ethyl hexyl glycidyl ether, and glycidyl esters of the formula:

wherein X is a branched alkyl hydrocarbon radical containing from about 5 to 30 total carbons. More preferably, X is a tertiary aliphatic group of from about 5 to 15 carbons and most preferably from 8 to 12 carbons, such as neopentanoate, neoheptanoate, and neodecanoate. (Glycidyl esters of commerically available mixtures of tertiary aliphatic carboxylic acids such as those available from Shell Chemical Company as VERSATIC ACID 911 are particularly preferred as the epoxy group and branched alkyl group containing compound. The glycidyl esters are commercially available from Shell Chemical Company as CARDURA E or GLYDEXX N-10 from Exxon Chemical Company.

The epoxy group and branched alkyl group containing compound is then reacted with carbon dioxide so as to produce a carbonate functional compound. A ring opening catalyst such as triphenyl phosphene or tertiary ammonium salt is normally employed. While the reaction will go under atmospheric pressure, positive pressures are usually used to reduce reaction time.

The resulting carbonate functional compound is subsequently reacted with ammonia or ammonium hydroxide to provide a the primary carbamate functional reactive additive of the invention.

Alternatively, rather than produce a carbonate functional compound, the epoxy could be reacted with water to form alcohols, with subsequent coversion of the alcohols into carbamates via transesterification, urea decomposition and the like.

In a second method of the invention, glycol diols having the same structures of the epoxy functional compounds listed above can be used as a starting material. Such glycol diols must have at least one alkyl group selected from the group consisting of branched alkyl groups of from 5 to 30 total carbons, straight chain alkyl groups of more than 10 carbons, and mixtures thereof Glycol diol as used herein refers to a diol wherein the two hydroxy groups are on adjacent carbons. Suitable glycol diols may contain other heteroatom groups as discussed above.

The glycol diols are reacted with phosgene or similar materials such as triphosgene. The resulting cyclic carbonate is then reacted as described above to form the primary carbamate functional reactive additive.

Finally, the glycol diols can be directly converted into primary carbamates using it techniques such as reaction with urea, HNCO gas, or transesterification with carbamate ester such as methyl carbamate.

The compound (C) will generally have a molecular weight of 131–2000, and preferably from 131–1000 and most preferably from 131 to 500. The glass transition temperature, $T_g$, of components (A), (B), and (C) can be adjusted to achieve a cured coating having the desired $T_g$ for the particular application involved. The compound (C) is preferably used at levels between 3 to 50 percent (based on total resin solids of the coating composition), and more preferably between 5 to 25 percent. Most preferably, reactive additive (C) will be used at a level of from 2 to 10 percent, based on the total resin solids of the coating composition.

According to the present invention, at least one of components (A) and (B), or both components (A) and (B) must have at least one group thereon that is reactive with the carbamate group(s) on component (C). This is preferably accomplished through the selection of an aminoplast as component (B). Depending on the cure conditions, other compounds identified above as component (B) may also be reactive with the carbamate group(s) on component (C). Component (A) may also contain groups that are reactive with carbamate, such as an acrylic polymer containing isobutoxymethyl acrylamide groups.

The coating composition of the invention can further contain catalysts to facilitate the reaction between polymer (A), (B) and (C). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. A most preferred catalyst for use in the coating composition of the invention is zinc nitrate.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

Electrodeposition coating compositions may be applied on a conductive substrate by the electrodeposition coating process at a nonvolatile content of 10 to 25% by weight to a dry film thickness of 15 to 35 microns. After application, the coating may be cured at an elevated temperature, depending upon the nature of particular base resins. Prior art cathodic electrodeposition coating typically cure at approximately 20 minutes at 350° F. (metal temperature). The cathodic electrodeposition coating compositions of the invention cure at 20 minutes at 310° F. or less (metal temperature), preferably at 20 minutes at 260° F. (metal temperature), most preferably 20 minutes at 200° F. (metal temperature).

The cathodic electrodeposition coatings of the invention are advantageous in that % weight loss upon crosslinking is less than 15%, preferably less than 10% and most preferably from 6 to 8%, based on the total weight of applied coating.

It will be appreciated that the method of cathodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

In a preferred embodiment, the cathodic electrodeposition method of the invention will be used to provide a first layer of electrodeposited coating on a metallic substrate.

A pigmented resin coating and optionally a clearcoat layer may be applied over primer layers, including electrocoat primer layers. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an i-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121° C. and 162° C., and most preferably between 121° C. and 141° C. The curing time will vary depending on the particular components used, and physical parameters such as the thickness of the layers, however, typical curing times range from 15 to 60 minutes.

The invention is farther described in the following examples.

EXAMPLE 1

Preparation of a Preferred Reactive Additive (C)

Part (A)

Preparation of Cyclic Carbonate of the Glycidyl Ester of Neodecanoic Acid

A mixture of 16428 parts of Glydexx N-10 (glycidyl ester of neodecanoic acid, commercially available from Exxon Chemical Company) and 125.5 parts of tetrabutyl ammonium bromide was heated under $CO_2$ pressure (6.5 bars) to 120° C. The reaction mixture was held at 120° C. under pressure until the reaction was complete. The product mixture was then cooled and excess carbon dioxide removed.

Part (B1)

Preparation of the Beta Hydroxy Carbamate

Ammonia gas was added to a mixture of 24290 parts of the product of Part (A) and 16192 parts of methanol. When the ring opening of the cyclic carbonate was complete, the methanol and excess ammonia was removed by vacuum.

Part (B2)

Alternative Preparation of the Beta Hydroxy Carbamate

To a solution of 200 parts of concentrated ammonium hydroxide was slowly added 700 parts of the cyclic carbonate of Neodecanoic acid glycidyl ester (part A). Once the reaction was complete, the excess water and ammonium hydroxide was removed by vacuum distillation.

EXAMPLE 2

Preparation of a Polymer (A) for Use in Preparing Cathodic Emulsion (I) Comprising Reactive Additive (C).

Part (i)

Preparation of Polymer Intermediate (A') and Reactive Additive (Ac')

To a 1 liter round bottom 4-neck flask set up with an addition funnel, condenser, temperature probe and mixing shaft was added 333.5 grams (1.5 moles) of isophorone diisocyanate (IPDI), 0.5 grams of dibutyltindilaurate and 152.0 grams of MIBK (methyl isobutyl ketone -urethane grade/dry). A total of 232.1 grams (1.95 moles) of hydroxypropyl carbamate (HPC) was added to the addition funnel. The HPC from the addition funnel was added to the flask at such a rate that the temperature was maintained at 34° C. to 40° C. The temperature was then maintained at 40° C. for three hours and the NCO content was verified by titration to be 682 grams product/eq NCO. (539 g solid/eq NCO). The final product was 78.8% solid content and contained 2 moles of carbamate functional intermediate (A') to 1 mole of "in-situ" generated carbamate reactive intermediate (Ac').

Part (ii)

Preparation of Polymer (A)

To a 3000 ml flask equipped with a mixer, condenser and temperature probe were added 376.0 g diglycidyl ether of bisphenol A (1 mole at EEW=188), 153.9 g bisphenol A (0.675 moles), 52.4 g dodecylphenol (0.2 moles) and 30.7 g xylene. The reaction was heated to 125° C. and 0.4 g of triphenylphosphine were added. The reaction was exothermic and the temperature was maintained at 150° C. for 1 hour and the weight per epoxy was confirmed to be 1263 g solid/eq. epoxy. The batch was cooled from 150° C. to 95° C. by the addition of 100.0 grams of MIBK. At 95 C., 300.0 g of the carbamate functional intermediate was added. The reaction temperature was maintained at 95 C. for 2.5 hours and the loss of isocyanate and completion of the graft reaction was confirmed by titration. At 95° C., 73.8 grams of a mixture of 27.6 grams (0.31 moles) of dimethylethanolamine, 37.8 grams of lactic acid (86%) and 36.0 grams of water were added. The temperature of the reaction was then maintained at 95° C. for 3 hours. The resin was diluted with 41.5 grams of propylene glycol phenyl ether and 41.5 grams ethylene glycol butyl ether and cooled to 60° C. The resin was 75% solids and had a molecular weight (Mw) of 4654 as measured by gel permeation chromatography. The resin has a carbamate equivalent weight of 1079 grams solid resin/equivalent carbamate. The meq Quat/gram NV is 0.352.

EXAMPLE 3

Preparation of a Cathodic Emulsion (I) Comprising Reactive Additive (C) According to the Invention 500.0 grams of the reaction product of Example 2 above, 230.9 grams of a butylated melamine resin (Monsanto Resimine 7539), 54.6 grams of the reactive additive (C) of Example 1, 23.0 grams of ethylene glycol butyl ether, 23.0 grams of propylene glycol phenyl ether were added to a one gallon vessel. This was mixed until homogenous. 8.3 grams of bismuth octocate catalyst and 5.5 grams of zinc nitrate catalyst were then added. A total of 1109 grams deionized water was added in portions with good mixing. The resulting emulsion had a solids content of 25%. Additonal DI water was added to reduced the viscosity and the organic solvent was allowed to strip from the stirred emulsion for one day. After one day, the stripped emulsion had a viscosity of 35 cps and was 23% solids. The pH was 5.2 and the conductivity was 1231 micromhos. The emulsion had a particle size of 1.52 microns. The meq Quat content was 0.29 meq quaternary ammonium sites/gram solid.

EXAMPLE 4

Preparation of a Cathodic Electrocoat Bath Using the Cathodic Emulsion (I) of the Invention

Part (i)

Preparation of a Grey Pigment Paste

To a tank were added the following materials in order, 2,624.2 parts of deionized water and 1,879.60 parts of a urethane epoxy resin solution prepared in accordance with Example II of U.S. Pat. No. 4,007,154. The materials were mixed for a minimum of ten minutes and the following added under low agitation, 38.50 parts of K-2000 additive, commercially available from Byk-Chemie, 127.20 parts of a black pigment, 217.9 parts of dibutyl tin oxide and 254.2 parts of lead silicate. The mixing speed was increased to high and the paste mixed for a minimum of ten minutes. 90.8 parts of clay-aluminum silicate was added. High speed mixing was maintained while 4,213 parts of white $TiO_2$ were added. The paste was mixed for a minimum of 45 minutes. Deionized water was added to obtain a viscosity of 75–85 KU.

Part (ii)

Preparation of a Cathodic Electrocoat Bath

To a gallon vessel were added 2391 grams of principal emulsion of Example 3 above and 150.0 grams of the grey pigment paste from Ex 4, part (i) above. The bath was diluted with 709 grams DI water. The bath had a pigment/binder ratio of 0.12 and a solids content of 20%. The bath was mixed for 2 hours in an open vessel. The bath had a pH of 5.4 and a conductivity of 642 micromhos.

EXAMPLE 5

Deposition of Cathodic Electrocoat Coating Composition (I) According to the Invention, i.e., Comprising Reactive Additive (C)

Using a DC rectifier a 4"×12" steel panels were coated via cathodic electrodeposition with the cathodic electrocoat bath of Example 4. The set voltage was 42 volts. The amps were set at 0.5 amps and the deposition time was 2.2 minutes. The bath temperature was 90° F. The dry film build was from 0.4 to 0.6 mils.

Cathode reaction $2H_2O + 2\ e^- \rightarrow H_2 + 2OH^-$

The panels were baked at temperatures from 280° F. to 320° F. with good results as indicated below.

| Test | Bake (30' @ 285° F.) | Bake (30' @ 300° F.) | Bake (30' @ 320° F.) | Control Bake[1] (30' @ 350° F.) |
|---|---|---|---|---|
| Hardness (Tukon/knoops) | 21.3 | 24.6 | 27.3 | 22 |
| 100 MEK rubs | Pass | Pass | Pass | Pass |
| Direct Impact (20 lbs) | Pass | Pass | Pass | Pass |
| 500 hrs Salt Spray (mm rust creep) | 0.10 | 0.15 | 0.15 | 0.15 |
| 20 cycle SCAB (mm rust creep) | 4.4 | 7.1 | 4.9 | 1.7 |

It can be seen that properties to or better than the control can be achieved at advantageously lower bakes.

Comparative Example 1

Preparation of a Polymer (A) for Use in Preparation of Cathodic Emulsion (H) Prepared without Reactive Additive (C)

Part (i)

Preparation of Polymer Intermediate (A') and Reactive Additive (Ac')

To a 1 liter round bottom 4-neck flask set up with an addition funnel, condenser, temperature probe and mixing shaft was added 333.5 grams (1.5 moles) of isophorone diisocyanate (IPDI), 0.5 grams of dibutyltindilaurate and 152.0 grams of MIBK (methyl isobutyl ketone-urethane grade/dry). A total of 232.1 grams (1.95 moles) of hydroxypropyl carbamate (HPC) was added to the addition funnel. The HPC from the addition funnel was added to the flask at such a rate that the temperature was maintained at 34° C. to 40° C. The temperature was then maintained at 40° C. for three hours and the NCO content was verified by titration to be 682 grams product/eq NCO. (539 g solid/eq NCO). The final product was 78.8% solid content and contained 2 moles of carbamate functional intermediate (A') to 1 mole of "in-situ" generated carbamate reactive intermediate (Ac').

Part (ii)

Preparation of Polymer (A)

To a 3000 ml flask equipped with a mixer, condenser and temperature probe were added 376.0 g diglycidyl ether of bisphenol A (1 mole at EEW=188), 171.0 g bisphenol A (0.75 moles) and 28.8 g xylene. The reaction was heated to 120° C. and 0.5 grams of triphenylphosphine were added. The reaction was exothermic and the temperature was maintained at 150° C. for 1 hour and the weight per epoxy was confirmed to be 1113 gsolid/eq. epoxy. The batch was cooled from 150° C. to 95° C. by the addition of 100.0 grams of MIBK. At 95 C. 342.0 g of the reaction product from Part (i) above was added. The reaction temperature was maintained at 95 C. for 2 hours and the loss of isocyanate and completion of the graft reaction was confirmed by titration. At 95° C., 72.1 grams of a mixture of 30.7 grams (0.345 moles) of dimethylethanolamine and 41.4 grams of lactic acid (86%) were added. The temperature of the reaction was then maintained at 95° C. for 3 hours. The resin was diluted with 41.5 grams of propylene glycol phenyl ether and 41.5 grams ethylene glycol butyl ether and cooled to 60° C. The resin was 75% solids and had a number average molecular weight (Mw) of 3354 as measured by gel permeation chromatography. The resin has a carbamate equivalent weight of 950 grams solid resin/equivalent carbamate. The meq Quat/gram NV is 0.390.

Comparative Example 2

Preparation of a Cathodic Emulsion (II) Prepared without Reactive Additive (C)

500.0 grams of the product of Example 1, Part (ii) described above, 187.5 grams of a butylated melamine resin (Monsanto Resimine 7539), 23.0 grams of ethylene glycol butyl ether, 23.0 grams of propylene glycol phenyl ether and 23.0 grams of a plasticizer (Milliken Synfac 8009/BPA+EO) were added to a one gallon vessel. This was mixed until homogenous. 6.0 grams of bismuth octocate catalyst and 1.0 grams of zinc nitrate catalyst were added. A total of 1319 grams deionized water was added in portions with good mixing. The resulting emulsion had a solids content of 20%. Additional deionized water was added to reduced the viscosity and the organic solvent was allowed to strip from the stirred emulsion for one day. After one day, the stripped emulsion had a viscosity of 35 cps and was 27% solids. The pH was 5.0 and the conductivity was 1231 micromhos. The emulsion had a particle size of 0.14 microns. The meq Quat content was 0.45 meq quaternary ammonium sites/gram solid.

Comparative Example 3

Preparation of a Cathodic Electrocoat Bath Using Cathodic Emulsion (ID) Prepared without Reactive Additive (C)

To a gallon vessel were added 1790.4 grams of cathodic emulsion (II) from Comparative Example 2 and 208.9 grams of grey pigment paste from Example 4, part (i) above. The bath was diluted with 1048 grams DI water. The bath had a pigment/binder ratio of 0.2 and a solids content of 20%. After mixing for 2 hours in an open vessel, the bath had a pH of 5.6 and a conductivity of 1191 micromhos.

Comparative Example 4

Deposition of Cathodic Electrocoat Coating Composition (II) Prepared without Reactive Additive (C)

Using a DC rectifier a 4"×12" steel panels were coated via cathodic electrodeposition in the cathodic electrocoat bath of Comparative Example 3. The set voltage was between 96 and 157 volts. The amps were set at 1.0 amps and the deposition time was 2.2 minutes. The bath temperature was 90° F.

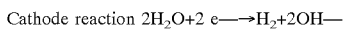

Cathode reaction $2H_2O+2$ e—→$H_2$+2OH—

The panels were baked at temperatures from 260° F. to 320° F. to obtain 0.6 to 0.8 mils dry film build with results as indicated below.

| Test | Bake (30' @ 285° F.) | Bake (30' @ 300° F.) | Bake (30' @ 320° F.) | Control Bake[2] (30' @ 350° F.) |
|---|---|---|---|---|
| Hardness (Tukon/knoops) | 28 | 27 | 22 | 22 |
| 100 MEK rubs | Pass | Pass | Pass | Pass |
| Direct Impact (20 lbs) | Pass | Pass | Pass | Pass |
| 500 hrs Salt Spray (mm rust creep) | 0.71 | 0.48 | 0.55 | 0.15 |
| 20 cycle SCAB (mm rust creep) | 4.6 | 2.1 | 2.0 | 1.7 |

EXAMPLE 7

Evaluation of Cathodic Emulsion (I) Prepared with Reactive Additive (C) Versus Cathodic Emulsion (II) Prepared without Reactive (C)

Test panels were prepared for both cathodic emulsion (I) and cathodic emulsion (II) as indicated respectively for Example 5 and Comparative Example 4, except that three panels, (dry film builds 0.35 mil, 0.45 mil, and 0.65 mil) were obtained for each composition. The different film builds were obtained by adjusting the deposition conditions, voltage, and amps.

The following data indicates that reactive additive (C) improves the compatibility between curing agent (B) and polymer (A) which results in better flow and improved leveling.

| Sample | Cathodic Emulsion (I) comprising 9% reactive additive (C) | | | Cathodic Emulsion (II) prepared without reactive additive (C) | | |
|---|---|---|---|---|---|---|
| Film Build[3] | 0.35 | 0.45 | 0.65 | 0.35 | 0.45 | 0.65 |
| Film Smoothness[4] | 12 | 12 | 17 | 36 | 43 | 62 |

[2]The control was a cathodic electrocoat composition commercially available from BASF Corporation of Southfield MI as Cathoguard ® 350. The control sample was prepared as indicated above in Example 4.
[3](mils) Measured with a Fischer Permascope M10B; Fischer, Windsor, CT.
[4](Ra in micro-inches) Measured via a Surtronic 3P Profilometer from Taylor-Hobson Ltd. Leicester, England.

| 60° Gloss[5] | 46 | 53 | 63 | 44 | 38 | 36 |
|---|---|---|---|---|---|---|

[5]Gloss was measured on a Byk-Gardner Micro-Tri gloss meter 4520, Byk Gardner of Silver Springs, MO.

The improvements in film smoothness and gloss due to the use of reactive additive (C) have thus been obtained without loss of performance properties.

What is claimed is:

1. A cathodic electrocoat coating composition comprising
   (A) a polymer comprising at least one primary carbamate group and at least one cationic salting site,
   (B) a curing agent having groups that are reactive with said functional groups on (A), and
   (C) a reactive additive comprising at least one compound having a molecular weight of from 131 to 2000 and comprising at least one primary carbamate group and at least one alkyl group selected from the group consisting of branched alkyl groups of from 5 to 30 carbons, straight chain alkyl groups of more than 10 carbons, and mixtures thereof, wherein one or both of (A) and (B) comprise groups that are reactive with the primary carbamate group of (C).

2. The cathodic electrocoat coating composition of claim 1 wherein polymer (A) comprises one or more units of the formula:

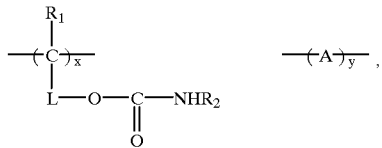

wherein $R_1$ represents H or $CH_3$, $R_2$ represents H, alkyl, or cycloalkyl, L represents a divalent linking group, A represents repeat units comprising at least one repeat unit having a cationic salting site, x represents 10 to 90 weight %, and y represents 90 to 10 weight %, with the proviso that there is at least one repeat unit where $R_2$ is H.

3. The cathodic electrocoat coating composition of claim 2 wherein the cationic salting site is an amine functional group.

4. The cathodic electrocoat coating composition of claim 3 wherein the cationic salting site is a tertiary amine group.

5. The cathodic electrocoat coating composition of claim 2 wherein the cationic salting site is a quaternary ammonium group.

6. The cathodic electrocoat coating composition of claim 1 wherein the cationic salting sites are salted with an acid.

7. The cathodic electrocoat coating composition of claim 6 wherein polymer (A) has a number average molecular weight of from more than 2000 to 100,000.

8. The cathodic electrocoat coating composition of claim 7 wherein polymer (A) has a number average molecular weight of from 3000 to 30,000.

9. The cathodic electrocoat coating composition of claim 1 wherein polymer (A) has a meq range of from 0.1 to 2.0.

10. The cathodic electrocoat coating composition of claim 9 wherein polymer (A) has a meq range of from 0.2 to 1.5.

11. The cathodic electrocoat coating composition of claim 1 wherein polymer (A) is present as an aqueous dispersion.

12. The cathodic electrocoat coating composition of claim 1 further comprising
   (Ac') a carbamate functional reactive additive which is generated in situ during the production of polymer (A).

13. The cathodic electrocoat coating composition of claim 1 wherein polymer (A) and (Ac') are the reaction products of a process comprising
   reacting a polyisocyanate (ai), and a compound (aii) comprising at least one group that is reactive with isocyanate and at least one carbamate group, so as to produce both an intermediate product (A') having at least one carbamate functional group and at least one isocyanate functional group, as well as a carbamate functional reactive additive (Ac') having no isocyanate functionality,
   reacting said intermediate product (A') with a compound having at least one epoxy group and at least one isocyanate reactive group, said reaction occurring in the presence of the reactive additive (Ac') so as to produce a carbamate functional resin having at least one epoxy group,
   reacting said at least one epoxy group of the carbamate functional resin with a tertiary amine compound in the presence of an acid to provide a carbamate functional resin (A) having one or more quaternary ammonium groups, said reaction occurring in the presence of the reactive additive so as to provide a resin composition comprising (A) a carbamate functional resin having one or more quaternary ammonium groups and (Ac') a carbamate functional reactive additive.

14. The cathodic electrocoat coating composition of claim 13 wherein the polyisocyanate (ai) is a diisocyanate.

15. The cathodic electrocoat coating composition of claim 14 wherein the polyisocyanate (ai) is isophorone.

16. The cathodic electrocoat coating composition of claim 13 wherein the compound (aii) is hydroxy propyl carbamate.

17. The cathodic electrocoat coating composition of claim 13 wherein carbamate functional reactive additive (Ac') has a number average molecular weight of from 250 to less than 2000.

18. The cathodic electrocoat coating composition of claim 13 wherein carbamate functional reactive additive (Ac') has at least two carbamate functional groups.

19. The cathodic electrocoat coating composition of claim 1 wherein the at least one alkyl group of reactive additive (C) is free of functional groups reactive with one or more of components (A) and (B).

20. The cathodic electrocoat coating composition of claim 1 wherein the at least one alkyl group is free of unsaturation.

21. The cathodic electrocoat coating composition of claim 1 wherein the reactive additive (C) has only one carbamate group.

22. The cathodic electrocoat coating composition of claim 1 wherein the at least one alkyl group is a branched alkyl group of from 8 to 12 carbons.

23. The cathodic electrocoat coating composition of claim 1 wherein the at least one alkyl group is a branched alkyl group of at least 9 carbons.

24. The cathodic electrocoat coating composition of claim 1 wherein the reactive additive (C) comprises a compound of the formula:

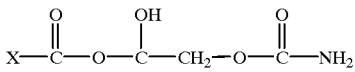

wherein X is a branched alkyl group of from 5 to 30 carbons.

25. The cathodic electrocoat coating composition of claim 24 wherein X is

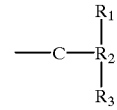

wherein $R_1$, $R_2$, and $R_3$ are alkyl groups of from 1 to 10 carbons each.

26. The cathodic electrocoat coating composition of claim 25 wherein $R_1$, $R_2$, and $R_3$ total from 8 to 12 carbons with at least one of $R_1$, $R_2$, and $R_3$ being a methyl group.

27. The cathodic electrocoat coating composition of claim 26 wherein one of $R_1$, $R_2$, and $R_3$ is hydrogen.

28. The cathodic electrocoat coating composition of claim 1 wherein the reactive additive (C) comprises a compound of the formula:

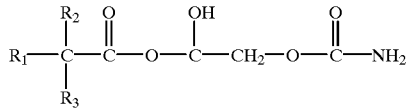

wherein $R_1$, $R_2$, and $R_3$ are each alkyl groups of from 1 to 10 carbons.

29. The cathodic electrocoat coating composition of claim 28 wherein $R_1$, $R_2$, and $R_3$ total from 8 to 12 carbons with at least one of $R_1$, $R_2$, and $R_3$ being a methyl group.

30. The cathodic electrocoat coating composition of claim 1 wherein curing agent (B) comprises an aminoplast resin.

* * * * *